US012811754B2

(12) United States Patent
Kenney et al.

(10) Patent No.: US 12,811,754 B2
(45) Date of Patent: Nov. 24, 2026

(54) CONTROL CHANNEL DIVERSITY SELECTION

(71) Applicant: L3Harris Technologies, Inc., Melbourne, FL (US)

(72) Inventors: Brent A. Kenney, Bountiful, UT (US); Jeffrey B. Bench, Lehi, UT (US); Brian J. Thorp, Sandy, UT (US)

(73) Assignee: L3Harris Technologies, Inc., Melbourne, FL (US)

( * ) Notice: Subject to any disclaimer, the term of this patent is extended or adjusted under 35 U.S.C. 154(b) by 235 days.

(21) Appl. No.: 18/783,118

(22) Filed: Jul. 24, 2024

(65) Prior Publication Data

US 2024/0380561 A1 Nov. 14, 2024

Related U.S. Application Data

(62) Division of application No. 17/686,761, filed on Mar. 4, 2022, now Pat. No. 12,069,001.

(51) Int. Cl.

| | |
|---|---|
| ***H04L 5/00*** | (2006.01) |
| ***H04W 72/0453*** | (2023.01) |
| ***H04W 72/541*** | (2023.01) |

(52) U.S. Cl.

CPC .......... *H04L 5/0073* (2013.01); *H04L 5/0046* (2013.01); *H04L 5/0048* (2013.01); *H04W 72/0453* (2013.01); *H04W 72/541* (2023.01)

(58) Field of Classification Search

CPC ... H04L 5/0073; H04L 5/0046; H04L 5/0048; H04L 2001/0092; H04L 1/0015;

(Continued)

(56) References Cited

U.S. PATENT DOCUMENTS

| | | | |
|---|---|---|---|
| 7,120,138 | B2 | 10/2006 | Soomro et al. |
| 7,526,461 | B2 | 4/2009 | Srinivasa et al. |

(Continued)

FOREIGN PATENT DOCUMENTS

| | | |
|---|---|---|
| JP | 4142451 | 9/2008 |
| KR | 100824949 | 4/2008 |

(Continued)

OTHER PUBLICATIONS

Haykin et al., "Spectrum Sensing for Cognitive Radio," Proceedings of the IEEE, vol. 97, No. 5, pp. 849-877 (May 2009).

(Continued)

*Primary Examiner* — Yu-Wen Chang

(74) *Attorney, Agent, or Firm* — Fox Rothschild LLP; Carol E. Thorstad-Forsyth

(57) ABSTRACT

Selecting a control channel set in a communication system involves monitoring received signals to identify a plurality of nodes of interest (NOI) and determining $E_b/N_0$ values for a plurality of control channels. For this purpose, a data metric and spectral data can be provided to the communication device by the respective NOI for which $E_b/N_0$ values are being determined. A comparison is made of the $E_b/N_0$ values for all NOI to select an optimal control channel set. The optimal control channel set is then used by the communication device to transmit the control channel information to the plurality of NOI.

13 Claims, 7 Drawing Sheets

(58) Field of Classification Search

CPC ....... H04L 1/0035; H04L 1/04; H04L 1/0026; H04W 72/0453; H04W 72/541; H04W 72/23; H04W 84/18; H04W 72/542; H04B 2201/709718; H04B 1/71; H04B 1/74; H04J 11/0066

See application file for complete search history.

(56) References Cited

U.S. PATENT DOCUMENTS

| | | | |
|---|---|---|---|
| 8,391,192 | B2 | 3/2013 | Prakash et al. |
| 8,494,464 | B1 | 7/2013 | Kadambe et al. |
| 8,688,065 | B2 | 4/2014 | Young et al. |
| 9,521,680 | B2 | 12/2016 | Jovicic et al. |
| 10,122,479 | B2 | 11/2018 | Dzierwa |
| 10,462,796 | B2 | 10/2019 | Frenne et al. |
| 10,644,815 | B2 | 5/2020 | Kleinbeck et al. |
| 11,303,313 | B2 | 4/2022 | Hsieh |
| 2006/0140251 | A1 | 6/2006 | Brown et al. |
| 2009/0122891 | A1 | 5/2009 | Bottero et al. |
| 2012/0281638 | A1 | 11/2012 | Ly-Gagnon et al. |
| 2015/0230105 | A1 | 8/2015 | Negus et al. |
| 2018/0138994 | A1 | 5/2018 | Wu et al. |
| 2020/0252942 | A1 | 8/2020 | Vanninen et al. |
| 2021/0282123 | A1 * | 9/2021 | Wong ........................ H04L 1/08 |
| 2022/0352943 | A1 | 11/2022 | Niu et al. |
| 2023/0112645 | A1 | 4/2023 | Zarubica et al. |
| 2024/0015745 | A1 * | 1/2024 | Pezeshki ............... H04L 5/0096 |

FOREIGN PATENT DOCUMENTS

| | | |
|---|---|---|
| KR | 101701441 | 2/2017 |
| WO | 9939472 | 8/1999 |
| WO | 2022042860 | 3/2022 |

OTHER PUBLICATIONS

Quan et al., "Collaborative Wideband Sensing for Cognitive Radios," IEEE Signal Processing Magazine, pp. 60-73 (Nov. 2008).

Chowdury et al., "Cognitive Wireless Mesh Networks with Dynamic Spectrum Access," IEEE J. on Selected Areas in Communications, vol. 26, No. 1, pp. 168-181 (Jan. 2008).

Chen et al., "Topology control in multi-channel cognitive radio networks with non-uniform node arrangements," 2011 IEEE Symposium on Computers and Communications (ISCC), pp. 1033-1037 (2011).

Toshiyuki et al., "Multiband hierarchical ad hoc network with wireless environment recognition," IEEE 2017 Asia-Pacific Signal and Information Processing Association Annual Summit and Conference (APSIPA ASC), pp. 1464-1469 (2017).

* cited by examiner

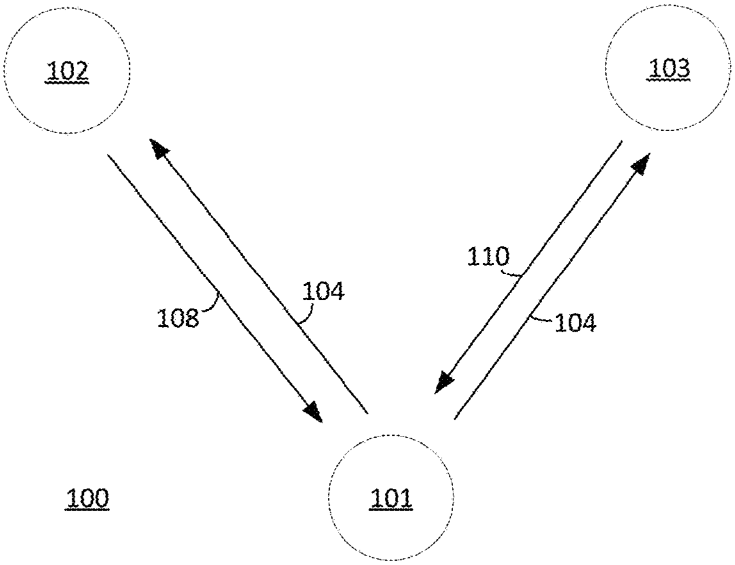
FIG. 1
FIG. 2A
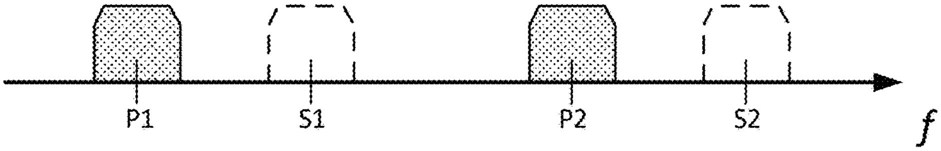
FIG. 2B
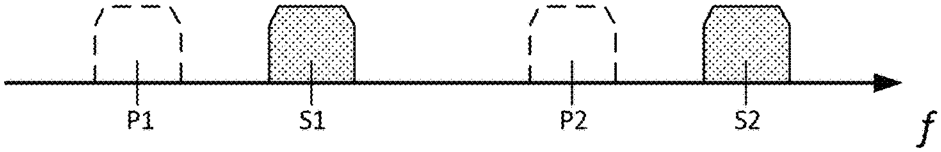

CONTROL CHANNEL DIVERSITY SELECTION

CROSS REFERENCE TO RELATED APPLICATIONS

The present application is a divisional of and claims the benefit of U.S. patent application Ser. No. 17/686,761 which was filed on Mar. 4, 2022. The content of this Patent Application is incorporated herein by reference in its entirety.

BACKGROUND

Statement of the Technical Field

The inventive arrangements relate to communication networks, and more particularly to methods and systems for managing one or more control channels in a communication network.

Description of the Related Art

In certain types of ad-hoc communication networks a control channel is made available that is separate from the data channels that are used to support the network. The control channel can facilitate various network management operations that allow the network to operate reliably and efficiently. For example, a control channel can facilitate distribution of information about the network availability and may share timing data with nodes that seek to join the network. The control channel can also broadcast certain information relating to the presence and identity of a local node. Information of this type can be useful to assist in network formation.

SUMMARY

Embodiments concern a method for selecting a control channel set from a plurality of control channel sets in a communication system. The method involves monitoring in a communication device received signals to identify a plurality of nodes of interest (NOI). For each of the NOI, a determination is made by the communication device of $E_b/N_0$ values for a plurality of control channels. This is accomplished by using one or more of a data metric and spectral data provided to the communication device by the respective NOI for which $E_b/N_0$ values are being determined. Thereafter, a comparison is made of the $E_b/N_0$ values of the control channels determined for all NOI to select an optimal control channel set. The optimal control channel set is the set of control channels on which the communication device will transmit the control channel information to the plurality of NOI.

One or more of the data metrics provided to the communication device can be determined by each of the NOI based on signals originating from the communication device and received at the NOI. According to one aspect, the data metric can be a Signal-to-Total Power Ratio (STPR) estimate and/or an $E_b/N_0$ value.

In some scenarios, the $E/N_0$ values for one or more of the plurality of control channels can comprise an estimate which is determined by the communication device. For example, the $E_b/N_0$ for a first one of the control channels can be determined using the spectral data provided by the NOI for the first one of the control channels and using the data metric provided for a second channel having a frequency different from the first one of the control channels. In this regard, the second channel can be one of the plurality of control channels or one of a plurality of data channels distinct from the plurality of control channels.

The data metric can also be used to determine a power level at which transmitted signals from the communication device were received at the NOI on the second channel. The communication device can then determine an estimated power level that the transmitted signals would have been received by the NOI on the first control channel.

The spectral data provided by the NOI for the first one of the control channels can be used to determine a received sub-band power level associated with the first one of the control channels. In such scenarios, the method can further involve subtracting from the received sub-band power level any in-band RF power associated with control channel transmissions which originated from the communication device during the measurement period. The method can also involve subtracting from the received sub-band power level any power associated with narrowband interfering signals that will be automatically rejected by the NOI.

According to one aspect, the comparison made of the $E_b/N_0$ values of the control channels for all NOI can involve certain operations. For example, these operations can involve selecting within each control channel set a first $E_b/N_0$ value that has the greatest magnitude. These operations can also involve comparing for each control channel set the plurality of first $E_b/N_0$ values determined across the plurality of NOI to determine a second $E_b/N_0$ value for each control channel set across all NOI that has the least magnitude. The process can also involve comparing the second $E_b/N_0$ value determined for each control channel set and then selecting the control channel set corresponding to the second $E_b/N_0$ value which has the greatest magnitude.

The solution also concerns a method for selecting a diversity control channel in a network communication system. This method can involve monitoring by a communication device received signals to identify a plurality of neighbor nodes of interest (NOI) which utilize two or more control channel sets. Each control channel set includes a plurality of diversity control channels, and each diversity control channel is respectively defined by a sub-band having a predetermined frequency range. The communication device estimates the received control channel power respectively associated with each NOI in a plurality of the diversity control channels which are actively in use by the NOT. It also obtains a composite NOI signal power for each of the diversity control channels. It does so by summing the received control channel power for the plurality of NOI within each sub-band. For each of the diversity control channels, the communication device uses the composite NOI signal power and information comprising the total power present in each sub-band to determine an interference power that is exclusively associated with unknown interference and noise in the sub-band. Finally, within each control channel set, the communication device selects a preferred diversity control channel from the plurality of diversity control channels which has the interference power of least magnitude. According to one aspect, the method can include selectively assigning a correlator to monitor the preferred diversity control channel of the control channel set.

The information comprising the total power within each sub-band can be based on measured total power in each of a plurality of spectral bins associated with each sub-band. As such, the method can further involve determining for each sub-band the average power per spectral bin associated with unknown interference and noise. In such scenarios, the average power per spectral bin associated with unknown interference and noise can be determined by (a) dividing the composite NOI signal power by the number of spectral bins associated with the sub-band to obtain a quotient representing an average received control channel power per bin, and (b) subtracting the quotient from the measured total power in each of the plurality of spectral bins associated with the sub-band.

The method can also involve modeling the removal of narrowband interference in at least one of the sub-bands by eliminating from consideration one or more of the spectral bins that are affected by the narrowband interference. In such scenarios, the average power per spectral bin associated with unknown interference and noise can be calculated after elimination of those spectral bins that are affected by the narrowband interference.

According to one aspect, the method can include a comparison of the average power per spectral bin associated with unknown interference and noise which has been calculated for each sub-band to determine the preferred diversity control channel. In such scenarios, the preferred diversity control channel is selected to have the lowest average power per spectral bin associated with unknown interference and noise.

In some scenarios, the estimating by the communication device of the received control channel power for the one or more diversity control channels which are actively in use can involve frequency translating an estimate of a received power from a first diversity control channel or first data channel to a second diversity control channel. For example, RF path loss versus frequency information can be used whereby an estimate of the received power from the first diversity control channel or first data channel can be used to estimate the received power of the second diversity control channel. Further, the communication device can use transmit power information communicated from one of the NOI to the communication device to estimate the received power of the second diversity control channel.

The solution also concerns a communication device. The communication device includes a receiver, a transmitter, and a processor. The processor is programmed to select a control channel set from a plurality of control channel sets. It does so by first monitoring received signals to identify a plurality of nodes of interest (NOI). Then, for each of the NOI, the processor respectively determines $E_b/N_0$ values for a plurality of control channels by using one or more of a data metric and spectral data provided to the communication device by the respective NOI for which $E_b/N_0$ values are being determined. Finally, the processor compares the $E_b/N_0$ values of the control channels determined for all NOI to select an optimal control channel set comprising a plurality of control channels on which the communication device will transmit the control channel information to the plurality of NOI.

In another scenario the processor monitors received signals to identify a plurality of neighbor nodes of interest (NOI) which utilize two or more control channel sets, each comprising a plurality of diversity control channels, each diversity control channel respectively defined by a sub-band having a predetermined frequency range. The processor estimates the received control channel power respectively associated with each NOI in a plurality of the diversity control channels which are actively in use by the NOI. It then obtains a composite NOI signal power for each of the diversity control channels by summing the received control channel power for the plurality of NOI within each sub-band. For each of the diversity control channels, the processor uses the composite NOI signal power and information comprising the total power present in each sub-band to determine an interference power that is exclusively associated with unknown interference and noise in the sub-band. Finally, within each control channel set, the processor selects a preferred diversity control channel from the plurality of diversity control channels which has the interference power of least magnitude.

BRIEF DESCRIPTION OF THE DRAWINGS

Embodiments will be described with reference to the following drawing figures, in which like numerals represent like items throughout the figures, and in which:

FIG. 1. is a diagram that is useful for understanding an ad-hoc communication network comprised of a plurality of network nodes.

FIGS. 2A and 2B are a set of drawings which are useful for understanding how primary and secondary control channels can be active at different times in an ad-hoc communication network.

DETAILED DESCRIPTION

Figure 3:
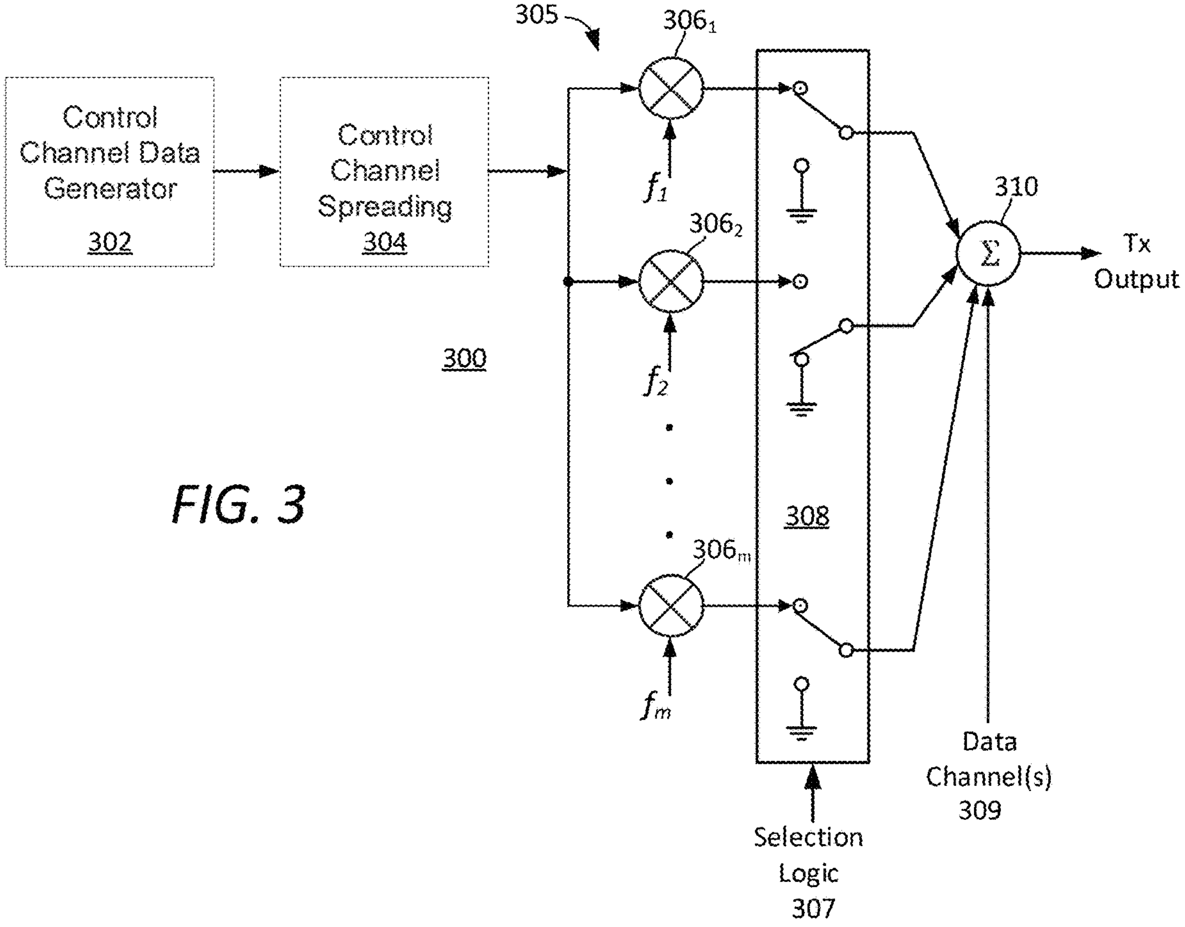
FIG. 3 is a simplified block diagram that is useful for understanding a transmitter system which can be included in a network node of an ad-hoc communication network.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

Embodiments disclosed herein may provide certain advantages in a communication network. In an ad-hoc communication networks a control channel is provided to facilitate various network management operations that allow the network to operate reliably and efficiently. The control channel can operate on a separate frequency from the data channels that are used to support the network. For example, a control channel can facilitate distribution of information about the network availability and may share timing data with nodes that seek to join the network. The control channel can also broadcast certain information relating to the presence and identity of neighboring communication devices. A node may receive information about itself on the control channel which can be useful to assist in network formation. More particularly, an embodiment improves the performance of ad-hoc communication networks by providing methods and systems for managing the selection of control channels In FIG. 1 there is shown a wireless mobile ad hoc data network (MANET) 100 comprising a plurality of nodes 101, 102 and 103. Each of the nodes 101, 102, and 103 comprise a communication device for participating in network communications. In some scenarios, a wireless spread spectrum communication technique can be employed by the nodes to facilitate control channel and data channel communications. Spread spectrum communication methods can improve channel re-use, minimize detection of transmissions by adversaries, and can help avoid adverse effects of interference. According to one aspect, a spread spectrum communication technique employed by network 100 can involve code-division multiple access (CDMA). CDMA type spreading schemes are well-known and therefore will not be described here in detail. However, it will be understood that CDMA involves a frequency spreading method whereby data messages communicated among the network nodes 101, 102, 103 are modulated using a spreading code or sequence.

In some scenarios, one or more control channels can be included as part of the CDMA waveform broadcast by each node to facilitate network related functions. For example, such functions can involve the provision of network-related information and timing data that allows nearby nodes to connect to one or more of the CDMA data channel(s). The control channel(s) can also be used to alert nearby nodes regarding the presence of a local node and its properties. As will be understood by those skilled in the art, control channels can have many uses in a mobile ad hoc network. Accordingly, the embodiments are not limited to the control channel functions specifically described herein.

The one or more control channels used by the network 100 can be configured for transmission at a relatively low power level and at a relatively low data rate. These features can make it less likely that the control channel will be detected by potential adversaries. According to one aspect, the control channel information can be transmitted on a plurality of different diversity channels having different frequencies. The diversity channels do not need to be comprised of the same signal, but they should carry the same control channel information. In the description that follows, the two or more frequencies which are used for a particular control channel are understood to define a control channel set. In some scenarios, a particular node can be assigned one or more control channel sets. For example, in certain embodiments described herein a particular node may have a primary control channel set and a secondary control channel set. The availability of a plurality of control channel sets can be advantageous for various reasons. For example, interfering RF signals may sometimes be present at one or more control channel frequencies. Also, propagation conditions can sometimes negatively affect certain frequencies. Having two or more sets of control channel frequencies can allow a node to ensure that its transmissions are being received by nearby nodes.

For purposes of describing a control channel selection method and system herein, it is assumed that each node is assigned a primary control channel set and a secondary control channel set. This arrangement is illustrated in FIG. 2 which shows that the primary control channel set is broadcast on two separate center frequencies P1 and P2 and the secondary control channel set is broadcast on separate center frequencies S1 and S2. In a scenario involving CDMA transmissions it will be understood that signal energy associated with a control channel transmission will not be limited to a specific center frequency. Instead, the RF energy associated with such transmission will be spread over a sub-band comprising a range of frequencies on either side of the control channel center frequency. In the present solution, it is assumed that the control channel frequencies and the control channel set information is known a priori by each node.

One or more of nodes 101, 102, 103 can comprise a transceiver which includes an RF transmitter and an RF receiver. The transceiver facilitates wireless communication of data and control channel information to other nodes of the network. Shown in FIG. 3 is a simplified block diagram which is useful for understanding a transmitter 300 that can be used in nodes 101, 102, 103 to facilitate CDMA transmissions of control channels and data traffic. The transmitter architecture is useful for understanding certain concepts described herein but it should be understood that the solution is not limited to the particular transmitter architecture shown. Other transmitter architectures are also possible, and all such architectures are intended to be included in the scope of the solution described herein.

The transmitter can comprise a control channel data generator 302 which generates digital control channel data which is to be broadcast to other nodes of the network. The transmitter also includes a control channel spreading block 304 which performs frequency spreading of the control channel data using a spreading code or sequence. A mixer network 305 is configured to translate the frequency-spread control channel data to various control channel transmit frequencies which may be needed. In some scenarios, this frequency translation can be accomplished using a set of mixers $\mathbf{306}_1$, $\mathbf{306}_2$, . . . $\mathbf{306}_m$ and a plurality of local oscillator mixer signals $f_1$, $f_2$, . . . $f_m$. A switching network 308 is controlled by means of a selection logic control signal 307. The switching network selects desired outputs from particular mixers $\mathbf{306}_1$, $\mathbf{306}_2$, . . . $\mathbf{306}_m$ corresponding to the control channel frequencies of a particular control channel set that is currently in use. These RF outputs are summed at combiner 310 with one or more RF signals comprising data channels 309 before being transmitted to other nodes comprising the network.

The foregoing arrangement can be effective for selectively generating control channel transmissions at a plurality of different control channel frequencies in accordance with a particular control channel set which has been selected from among a plurality of such control channel sets. However, there remains the non-trivial problem of selecting by a transmitting node a best or optimal control channel set to be used in any given scenario. One option would be to transmit one or more control channels at fixed frequencies. However, this approach is susceptible to jamming of the control channel frequency or frequencies. Such jamming can potentially interfere with node acquisition and network formation. Another alternative can involve transmitting a relatively large number of control channels simultaneously. However, each additional channel requires the digital signal transmitted by a node to be reduced further due to higher peak-to-average power ratio (PAPR). This can result in a higher transmitter noise floor and is therefore not an ideal solution.

Figure 4:
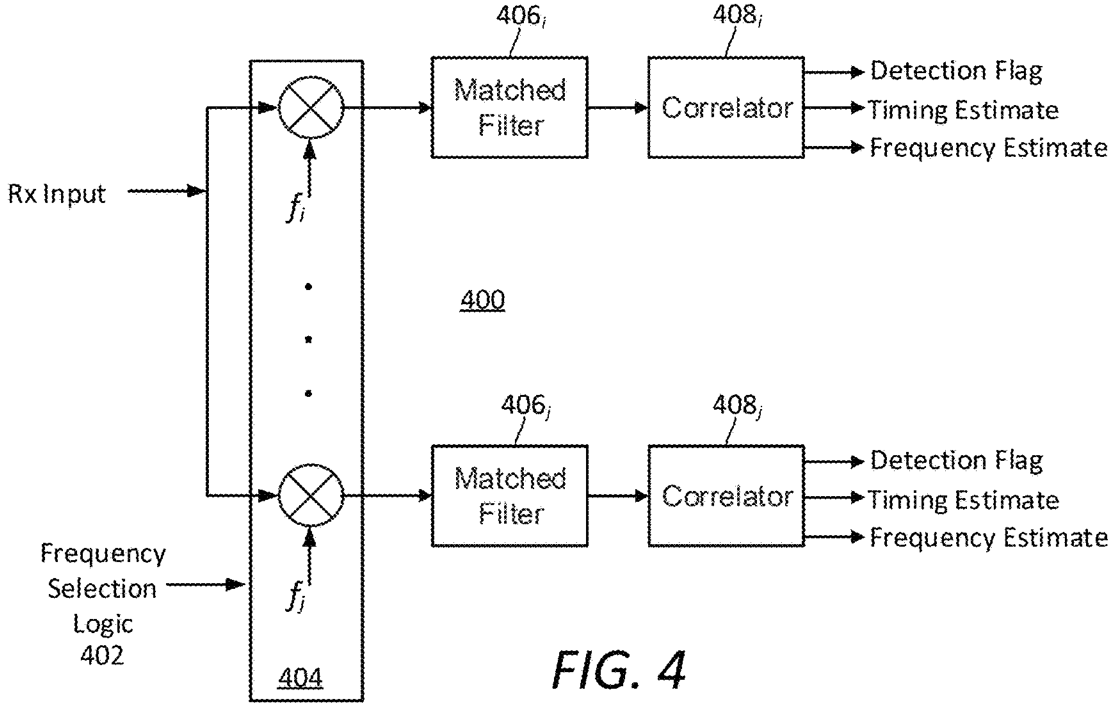
FIG. 4 is a simplified block diagram that is useful for understanding a receiver system which can be included in a network node of an ad-hoc communication network.

The existence of many potential control channels and the fact that such channels can transmit infrequently or at a low duty cycle can create challenges for ensuring that a receiving node will quickly detect such transmissions. Contributing to this problem is the nature of the control channel insofar as the transmitting node does not notify the receiving node of a control channel frequency change. Shown in FIG. 4 is a simplified block diagram which is useful for understanding a receiver 400 that can be used in nodes 101, 102, 103 to facilitate receiving of CDMA control channel transmissions from nearby nodes. The receiver architecture advantageously facilitates detection of control channel transmissions from such nodes when the currently active control channel transmission frequency is not known in advance by the receiving node. However, it should be understood that other receiver architectures are also possible, and the solution is not limited to the specific receiver architecture shown in FIG. 4.

In the receiver 400 a plurality of mixers in a down-conversion block 404 are used to down-convert one or more received RF signals at various control channel frequencies which may be in use by nearby nodes. The control channel frequencies which may be in use can be a priori specified in accordance with two or more sets of control channel frequencies. However, even with such information the receiver 400 will lack a priori knowledge of which particular control channel frequency set is currently in use by other nodes at any given time. Also, each control channel set in use by a nearby node can comprise concurrent transmissions at two or more RF frequencies for diversity purposes. But due to various forms of interference, a receiver 400 may only be able to effectively receive control channel transmissions on one such control channel frequency at any given time. Accordingly, the down-conversion block can be advantageously configured to selectively receive and down-convert RF signals at a plurality of different possible control channel frequencies which may be in use at a given time.

The various control channel RF frequencies which are to be processed in the receiver 400 can be controlled or selected in accordance with frequency selection logic control signal 402. The resulting down converted or intermediate frequency signals can then be filtered in one or more matched filters $\mathbf{406}_i \ldots \mathbf{406}_j$ to reject unwanted RF frequencies. Finally, a correlator $\mathbf{408}_i \ldots \mathbf{408}_j$ associated with each receiver channel can be used to detect the presence of a control channel signal present on a particular channel. Correlators are well-known and therefore will not be described here in detail. However, it should be understood that each of the correlators $\mathbf{408}_i \ldots \mathbf{408}_j$ can be configured to detect preamble energy associated with a preamble of a control channel data packet present in the received signal. Each such correlator can generate a detection flag when the presence of the control channel signal is detected and output an initial frequency estimate of the control channel signal. The correlator can also generate a timing estimate which may be used for demodulating the control channel transmissions.

The arrangement shown in FIG. 4 can be effective for detecting the presence of one or more control channel transmissions at one or more frequencies. However, correlators are resource intensive circuits and it is understood that each correlator can only process one center frequency at a time. Accordingly, it can be impractical for a particular network node to provide a correlator to continually evaluate all possible control channel frequencies which may be in use by nearby nodes at any given time. It is therefore advantageous to minimize the number of correlators which are needed in each receiving node while maximizing the likelihood of receiving control channel transmissions. Another option can involve cycling through all possible control channel frequencies in a cyclical fashion. But this approach is necessarily time-consuming and therefore prone to missing control channel transmissions from other nodes.

Transmit Control Channel Set Selection

During operation, a network node 101 generates and transmits a first wireless signal(s) 104 over communication channel(s) provided by network 100. The signal(s) can include, but are not limited to, communication signals (e.g., data channels) and control signals (e.g., beacon signals). The signal(s) 104 is(are) received by another network node(s) 102, 103. In response to the signal(s) 104, network node(s) 102, 103 generate(s) and send(s) responsive signal(s) 108, 110 to network node 101. As explained below, these responsive signals contain information or metrics that are useful for allowing node 101 to evaluate link performance.

The metrics generated in each node can include, a Signal-to-Total Power Ratio (STPR) estimate determined based on a second signal (e.g., a signal including the first signal combined with at least one of noise and one or more interference signals (e.g., jamming signals)). As such, the STPR estimate accounts for the receiver performance including chip rate processing gain, and in some scenarios the performance of an interference cancellation circuit used to remove the interference signals from the second signal. The metrics can also include but are not limited to a power corresponding to the STPR estimate, a data rate corresponding to the STPR estimate, a Signal to Noise Ratio (SNR) measurement and spectral power measurements. The spectral power measurements can include, but are not limited to, the power per frequency bin. Components of the spectral power measurements include, but are not limited to, a power of a Signal-Of-Interest (SOI) (i.e., a signal sent from node 101), a power of each interfering signal, and a power of a noise signal. The manner in which such metrics may be estimated, computed, or otherwise determined is described in greater detail in U.S. patent application Ser. No. 17/500,569 filed on Oct. 13, 2021, the disclosure of which is incorporated herein by reference in its entirety.

In a solution disclosed herein, node 101 uses one or more components of the information from the remote nodes 102, 103 for channel selection. In particular, a node 101 can use the received information to determine an optimal control channel frequency for its control channel transmissions directed to neighbor nodes. Once a control channel has been selected, node 101 performs operations to communicate information over the same.

A transmit control channel selection process will now be described in relation to FIGS. 5-7. The goal of the process is for a communication node to select the control channel set comprised of two or more frequencies that are likely to be best received by all current and desired neighbors. The process is facilitated by using one or more link data metrics that are determined by a local node based on the feedback received from neighboring nodes.

Figure 5A:
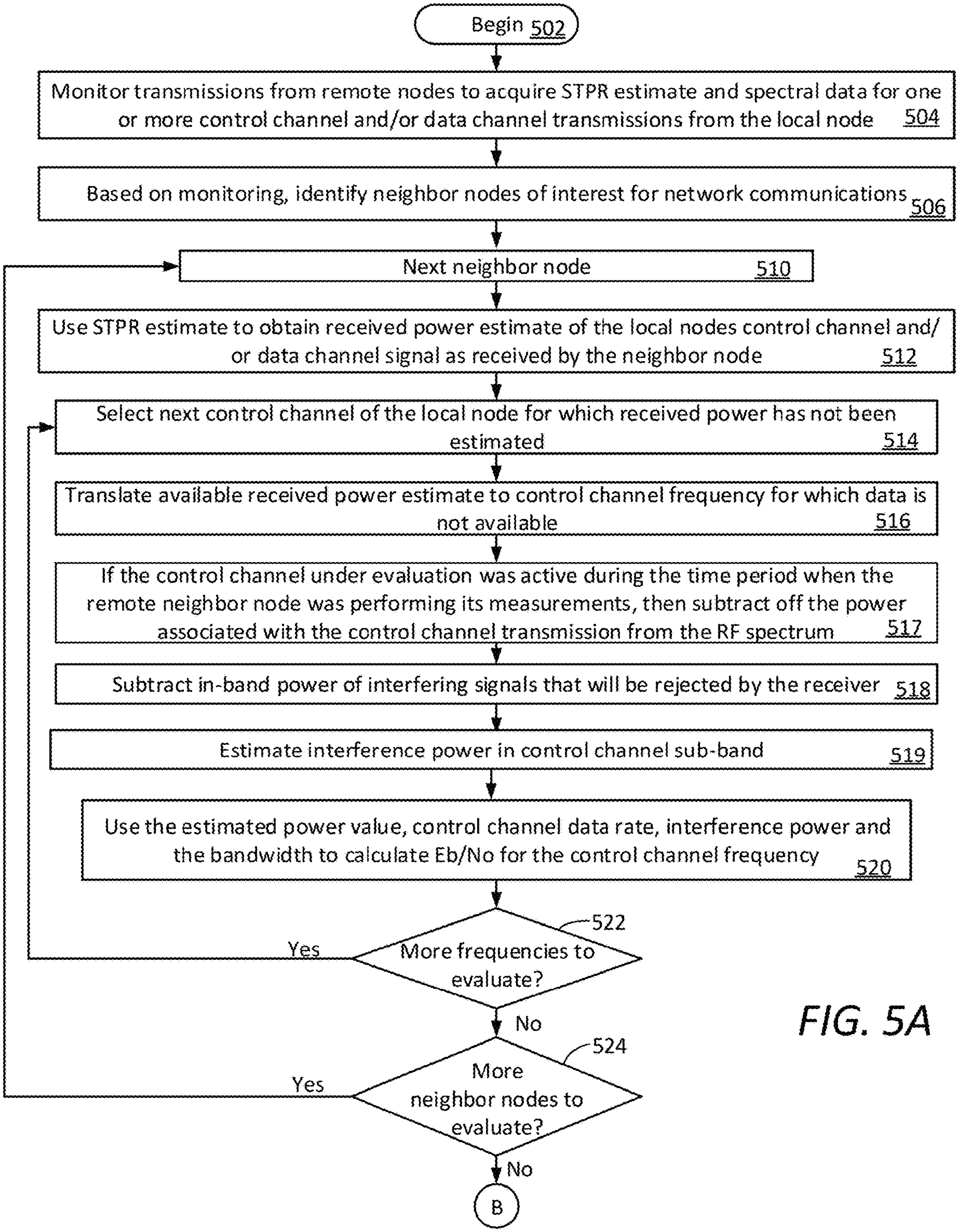
FIGS. 5A-5B (collectively referred to herein as FIG. 5) comprise a flowchart that is useful for understanding a method for transmitter control channel diversity selection.
Figure 5B:
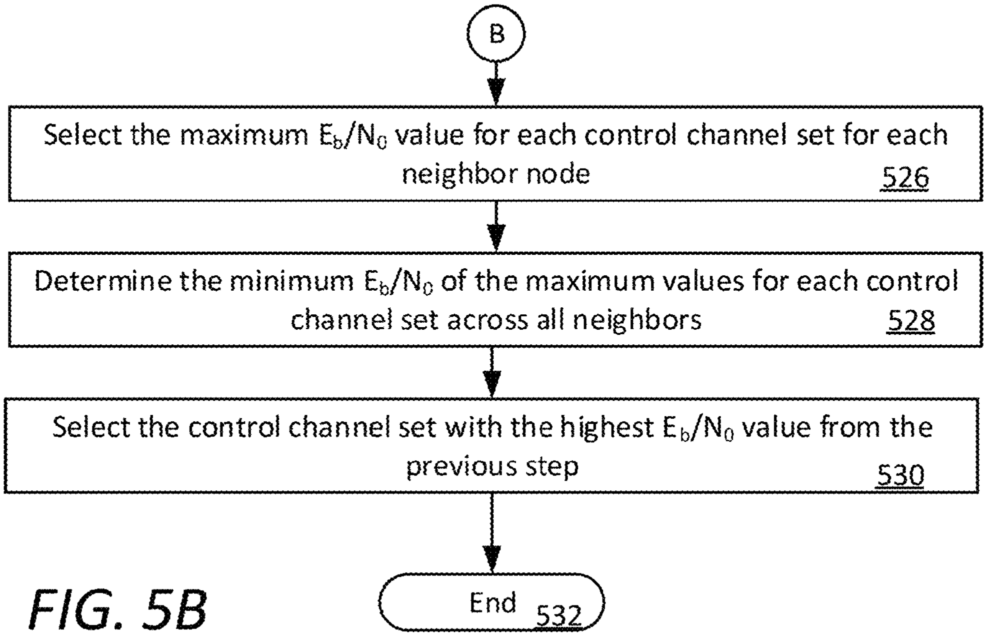

Referring now to FIG. 5, the process begins at 502 and continues to 504 where a communication node of the network identifies the presence of one or more neighbor nodes. As explained above, remote nodes will acquire spectral data and generate link data metrics based on transmissions originating from the local node. The remote neighbor nodes will transmit or broadcast such information so that it can be received by the local node. This process may be understood with reference to FIG. 1 which illustrates node 101 receiving responsive signal(s) 108, 110 containing signal metrics and spectral feedback data originating from remote neighbor nodes 102, 103. At 504 the local node will monitor transmissions from one or more remote neighbor nodes to acquire the STPR estimate and/or similar data from which $E_b/N_0$ data can be obtained for one or more control channel and/or data channel transmissions which originated from the local node. In a similar way, the local node can obtain spectral data acquired by the remote neighbor node for a range of frequencies associated with the control channel and/or data channel transmissions.

The transmissions from the remote neighbor nodes will include information which indicates the identity of each remote neighbor node when it transmits link metrics and spectral data. Accordingly, based on monitoring of such communications, the local node can at 506 determine an identity of each neighbor node providing the link data metrics in 504.

Once all neighboring nodes have been determined at 504-508, the process continues on to 510-524. The operations described at 510-524 are iterative in nature and make use of the available link metric and spectral data information provided by the remote neighbor nodes. As explained below in further detail, this information is used to evaluate each possible control channel frequency which may be used by a particular local node in order to identify a control channel set that is optimal for communicating with all remote neighbor nodes of interest.

At 510, a first one of the identified remote neighbor nodes is selected for evaluation. At 512 the local node uses data provided by the remote neighbor node that has been selected to determine a received power estimate of the control channel and/or data channel transmissions of the local node as received by the neighbor node. In some scenarios, this information can be derived by the local node from the STPR estimate communicated by the remote neighbor node. For example, the received power estimate can be obtained in some scenarios by multiplying the STPR estimate by a sum of a total spectrum over given frequency bins or Discrete Fourier Transform (DFT) bins. This power estimate information is then stored by the local node in a data store or memory location of the local node. At this point, the local node has sufficient information to calculate $E_b/N_0$ data for one or more control channels and/or data channel transmissions that were received and processed by the remote neighbor node under evaluation. But it does not have similar data needed for calculating $E_b/N_0$ values for other potential alternative control channels. So, the corresponding information for such other potential control channels must be estimated to allow the local node to evaluate all potential control channel options. Accordingly, the process continues on at 514-520 where the accessible information at the local node is used to generate suitable $E_b/N_0$ estimates for those control channels where such information is not directly available.

At 514 the local node selects one of the control channels for which it does not yet have $E_b/N_0$ data. At 516 the local node will translate the available received power estimate from 512 to the control channel which has been selected at 514. This step can involve use of available RF path loss versus frequency information to estimate a power level that a transmission from the local node would have been received at the remote neighbor node if a particular control channel frequency under evaluation had in fact been used for such transmission and/or processed by the remote neighbor node.

Thereafter, at 517-518 the local node will estimate the power of any interfering signals in the sub-band associated with the particular control channel frequency under evaluation. This power estimate for a frequency sub-band of interest can be generated using spectral power data provided to the local node by the remote neighbor node which is under evaluation. The spectral power data from the remote neighbor node is comprised of one or more measurements of signal power contained in a sub-band associated with a particular control channel. The spectral power data can be determined by summing the relevant spectral power estimates measured across the given frequency sub-band. In some scenarios, the spectral power estimates can comprise a DFT. At least some of the spectral power can comprise information associated with noise and other interference signals that are present within the sub-band. But in some scenarios, some of the spectral energy within a particular control channel sub-band that is measured by the remote neighbor node will comprise control channel signals that originate from the local node. So, part of the estimating process can involve removing or subtracting any RF power associated with control channel transmissions originating from the local node.

It will be understood that any power associated with control channel transmissions from the local node should not be included in any interference power estimate for that particular sub-band. Accordingly, if the control channel under evaluation was actively in use by the local node during the time period when the remote neighbor node was performing its spectral measurements of the corresponding control channel sub-band, then any power associated with such transmissions should be subtracted at 517 from spectral power that was measured for that particular sub-band. Note that this situation can occur in scenarios where the local node is actively transmitting on a particular control channel set (e.g., primary control channel set consisting of P1 and P2) but the remote neighbor node is only actively generating STPR estimates based on one such control channel frequency (e.g., P2).

A further part of developing the interference power estimate involves subtracting at 518 any power associated with interfering signals where it is known that the remote neighbor node is capable of removing such interfering signals during the receive process. For example, this may include narrowband interference that can be removed in a suitable excision process performed at the remote neighbor node. For purposes of the present disclosure, such narrowband interference can be understood as interference contained within a bandwidth that is significantly less than a bandwidth of the signal of interest. When narrowband interference is identified and removed, an adjustment is advantageously made with respect to the signal power estimate for the particular control channel which contained the narrowband interference. For example, if 5% of a particular control channel sub-band is excised to remove narrowband interference, then the signal power estimate for that sub-band is also reduced by 5%. After steps 517 and 518 are completed, any remaining power is understood to comprise noise and interference which should be included at 519 in the final estimate of interfering signal power within the sub-band under consideration.

At this point in the process, the local node has (1) an estimated value of the power level that a control channel signal from the local node would have been received by the remote neighbor node if the selected control channel frequency had been in use, and (2) a power estimate for interference signals present in the sub-band associated with the particular control channel frequency. Accordingly, at 520 the local node can generate an $E_b/N_0$ estimate for the control channel under evaluation. It generates this estimate using the estimated power value obtained at 516, the control channel data rate, the bandwidth of the control channel, and the interference power estimate obtained at 518.

At 522 the local node determines whether there are, for the particular neighbor node under consideration, more potential control channel frequencies for which $E_b/N_0$ estimates are required. If so (522: Yes), the process returns to 514 where the estimating process is repeated. If not (522: No) then the process continues on to 524 where a determination is made as to whether there are additional neighbor nodes that require evaluation. If so (524: Yes), the process returns to 510 where the next neighbor node is selected, and steps 512-522 are repeated. If there are no other neighbor nodes which require evaluation (524: No) then the process continues on to 526.

Figure 6:
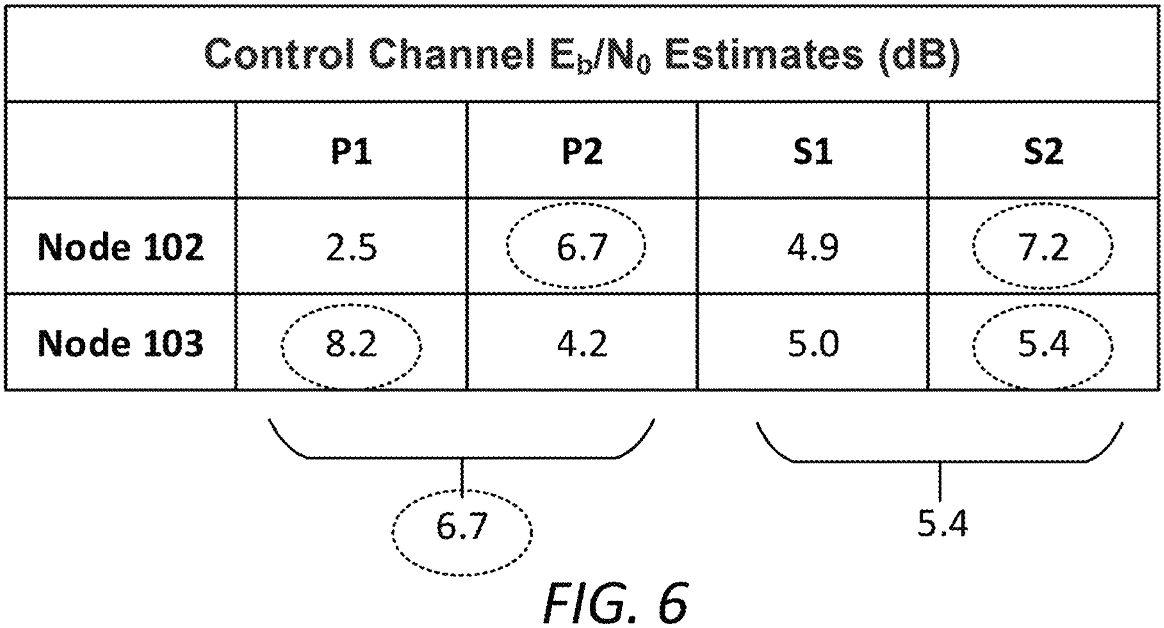
FIG. 6 is a table which is useful for understanding how certain data can be used for transmitter control channel diversity selection.

To assist in understanding the remainder of the selection process at 526-530 there is shown in FIG. 6 an example scenario in which a local node (e.g., node 101) has filled an $E_b/N_0$ table with measured and estimated values in accordance with steps 504-524. In this example, there are two control channel sets. A primary control channel set is comprised of frequencies P1, P2 and a secondary control channel set is comprised of frequencies S1, S2.

At 526, for each neighbor node, a selection is made based on a comparison of the $E_b/N_0$ values within a particular control channel set. More particularly, the $E_b/N_0$ values for the two or more control channel frequencies in a particular set are compared to determine which is greater. The control channel with the greater $E_b/N_0$ value is then selected. This operation is conceptually illustrated in FIG. 6 where for each neighbor node 102, 103 a maximum $E_b/N_0$ value is selected for both the primary and secondary control channel set. For example, with regard to node 102 the maximum $E_b/N_0$ value in the case of the primary control channel set is 6.7 corresponding to P2 (6.7>2.5). Accordingly, the value 6.7 is circled in FIG. 6 to indicate that the $E_b/N_0$ value associated with control channel P2 has been selected. The secondary control channel set is then considered with respect to Node 102. With regard to the secondary control channel set, the maximum $E_b/N_0$ value is 7.2 corresponding to S2 (7.2>4.9). The value 7.2 is circled in FIG. 6 to indicate that this $E_b/N_0$ value corresponding to S2 has been selected. In a similar manner the values 8.2 (corresponding to P1) and 5.4 (corresponding to S2) are identified as maximum $E_b/N_0$ values for the primary and secondary control channels respectively in the case of node 103.

The process continues at 528 where a further selection is made from among the maximum values previously identified at 526. Among the maximum values identified at 526, a determination is made to select the minimum $E_b/N_0$ value across all neighbor nodes for each control channel set. This selection is conceptually illustrated in FIG. 6. When considering the primary control channel set across all neighbor nodes 102, 103 the value 6.7 (corresponding to P2) is the lesser magnitude among the maximum $E_b/N_0$ values previously identified (i.e., 6.7<8.2). A similar analysis is performed with regard to the secondary control channel set S1, S2. When considering the secondary control channel set across all neighbor nodes, the value 5.4 (corresponding to S2) is the lesser magnitude of the maximum $E_b/N_0$ values previously identified (i.e., 5.4<7.2).

At this point in the process it may be noted that a single value $E_b/N_0$ value has been selected with respect to each control channel set across all nodes 102, 103. This single value for each control channel set serves as a figure of merit (FOM) for the control channel set. In the example shown in FIG. 6, this FOM value for the primary control channel set is 6.7 and the FOM value for the secondary control channel set is 5.4. At 530 a final operation is performed whereby a particular control channel set is finally selected for use. The control channel set that is selected is the one which has the greater magnitude FOM value. Stated differently, the control channel set is selected that has an FOM value (based on measured and calculated $E_b/N_0$ estimates) that has the greater magnitude among the lesser magnitude values chosen in step 528. In the example shown in FIG. 6, the primary control channel set would be selected for use since 6.7>5.4.

Selection of Receiver Control Channel Frequencies for Monitoring

In addition to determining the control channel frequencies on which it will transmit, each node will advantageously choose which control channel diversity frequencies it will monitor for transmissions from other nodes. This is a particular concern in scenarios where there may be a plurality of possible control channel sets, where each set is comprised of a plurality of different diversity control channel frequencies (e.g., P1, P2 and S1, S2). In these and other scenarios, it is advantageous to minimize the number of correlators that are needed to monitor diversity frequencies associated with each control channel set. At the same time, it is advantageous to maximize the likelihood of receiving control channel transmissions from all of the various neighbor nodes. This goal is accomplished by ensuring that the particular diversity frequency to which the correlator is assigned in the case of each control channel set is the diversity frequency which has the lowest level of noise and interference. Such an assignment will allow the local node to have the greatest ability to hear potentially distant neighbors. However, it can be challenging for a local node to identify such an optimal diversity channel selection with lowest noise and interference in an environment potentially comprising multiple nodes broadcasting control channel signals, wideband jammers, narrow-band jammers, and noise.

Figure 7:
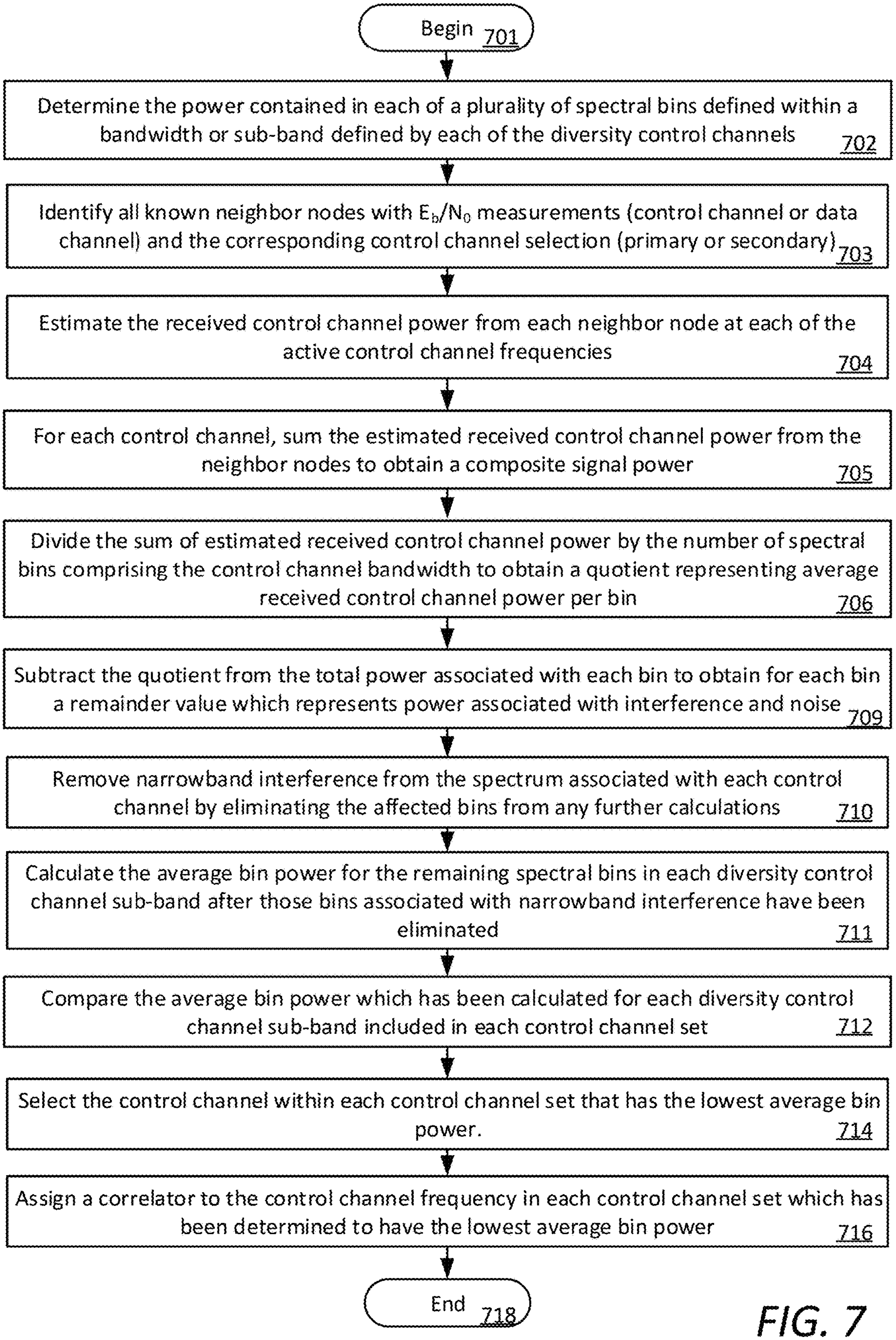
FIG. 7 is a flowchart that is useful for understanding a method for receiver control channel diversity selection.

Accordingly, the process shown in FIG. 7 involves a method for selecting a diversity control channel in a network communication system. The process involves identifying at a node, one or more preferred control channel diversity frequencies to which a correlator will be advantageously assigned for monitoring purposes. An objective of this process is for the node to select, for each control channel set, the diversity frequency within the set that has the least amount of noise and unknown interference. So, for example, in the case of the primary control channel set described herein the objective would be to select between P1 and P2, and in the case of the secondary control channel set, the objective would be to select between S1 and S2.

The process begins at 701 and continues at 702 which involves acquiring data indicating the total RF power in each of a plurality of spectral bins defined within a bandwidth or sub-band of each diversity control channel. The local node can determine this RF power data for each bin automatically when monitoring a particular control channel. The purpose and use of this data will become apparent in the discussion below. However, it may be noted that the total RF power present in a particular sub-band can be determined by summing the total RF power in each of the spectral bins of that particular sub-band. The process continues at 703 where neighboring nodes of interest (sometimes referred to herein as nodes of interest or NOI) are identified by monitoring transmissions from such nodes and obtaining $E_b/N_0$ measurements. For example, in FIG. 1 this could involve a receiving node 101 monitoring transmissions from neighboring nodes 102, 103.

Figure 8:
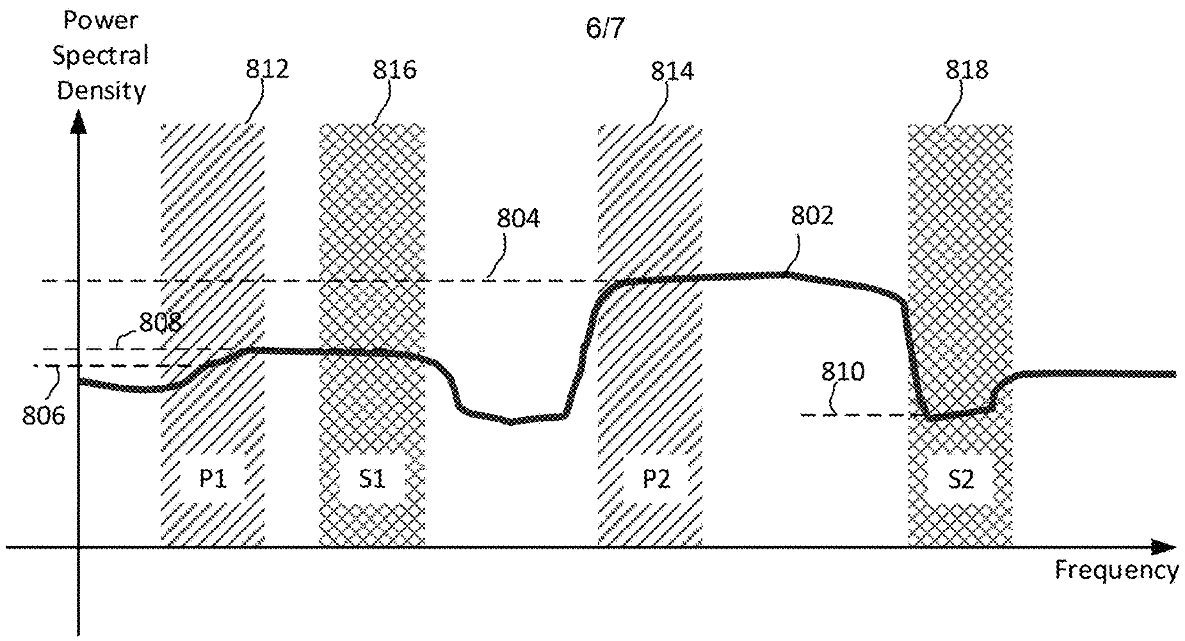
FIG. 8 is a graphical representation of power spectral density as measured over a range of frequencies which include primary and secondary control channel sets.

As an example, consider the scenario shown in FIG. 1 in which it is assumed that nodes 102 and 103 are both transmitting control channel data at control channel diversity frequencies P1 and P2 as specified by the primary control channel set. In this example, node 101 is monitoring such transmissions and receives a spectrum of RF energy which is represented in FIG. 8 by power spectral density plot 802. In FIG. 8, sub-bands associated with control channel frequencies P1, P2, S1, S2 are respectively referenced by shaded areas 812, 814, 816, and 818.

The control and data channel transmissions from the remote neighbor nodes will include information which indicates the identity of each remote neighbor node. Accordingly, based on monitoring of such communications, the local node can determine at 703 an identity of each neighbor node which is being received at the local node. Further, such monitoring operations will allow the local node to determine which control channel frequency set (e.g., a primary or secondary set) is currently in use by each of the neighbor nodes of interest. This frequency information can be contained in messages which are included in control channel transmissions and/or data channel transmissions from the remote neighbor node.

In the example of FIGS. 1 and 8, the Node 101 identifies node 102 and node 103 as valid neighbors because it has valid $E_b/N_0$ measurements corresponding to expected control and/or data channel transmissions from such nodes. A valid $E_b/N_0$ measurement needs to be within a certain time window. Nodes associated with a stale estimate are not considered in the evaluation process because they may skew the selection of an optimal control channel frequency to which a correlator should be assigned.

The process continues at 704 where the local node estimates the received control channel signal power with respect to each of the active control channel diversity frequencies in use by each neighbor node. The local node can calculate this power estimate based on the metrics it automatically generates when monitoring a particular control channel. For example, the local node can first determine the STPR value for the received signal from each neighbor node, and then multiply the STPR by the total power summed over the received channel's bandwidth. This yields the received signal power of the measured channel. Similarly, the local node can generate power estimates for each data channel that it is actively monitoring.

The necessary data metrics for one or more control channel diversity frequencies of an active control channel set may not be directly available to the local node in some scenarios. For example, consider a scenario where only one correlator is available to be assigned per active control channel set. Further assume the available correlator was assigned to control channel frequency P1. In such a scenario, only control channel transmissions on P1 would be monitored by the local node. Accordingly, the local node in such a scenario would not have signal metrics directly available for P2. In these circumstances, a power estimate for one or more other diversity channels (P2 in this example) could be determined at 704 by translating a received power estimate determined for P1 to the control channel frequency P2. This step can involve use of available received signal power estimates for other control channel frequencies (e.g., P1) in combination with RF path loss versus frequency information. This information can then be used to estimate a power level that a transmission from the remote neighbor node would have been received at the local node if P2 had been monitored. Similarly, received power measurement data from one or more data channels (if available) could be translated by the local node to estimate received signal power on an unmonitored control channel diversity frequency.

After the estimating operations at 704 are completed, the local node will have for each of N neighbor nodes, a set of received control channel power estimates for all control channel diversity frequencies of the active control channel set. These power estimates can be represented as:

$$P_{P1,i},\ P_{P2,i},\ P_{S1,i},\ \text{and}\ P_{S1,i}$$

where i represents an index value associated with a particular neighbor node.

For example, if Node 102 is actively using the primary control channel set, then the local node 101 will have power estimates for control channel diversity frequencies P1 and P2 in use by Node 102. Note that in such a scenario, the power estimates for control channel diversity frequencies associated with the secondary control channel set would be zero for Node 102 since the secondary control channel set would be inactive. Similarly, if Node 103 is actively using the secondary control channel set, then the local node 101 will have power estimates for the control channel diversity frequencies S1 and S2 in use by Node 103. The power estimates for control channel diversity frequencies associated with the primary control channel set would be zero for Node 103.

The process continues at 705 where the local node sums the estimated received control channel power from each of the various neighbor nodes. This sum, which is sometimes referred to herein as a composite signal power, represents the total signal power present in each control channel that is attributable to actual control channel transmissions from its N neighbor nodes. For example, in the case of control channel P1, this sum for the N neighbor nodes could be represented as $$\sum_{i=1}^{N} P_{P1,i}.$$

At 706 this sum for each control channel is then divided by the number of spectral bins comprising the control channel bandwidth to obtain a quotient. The quotient represents the average power per bin received at the local node as a result of control channel transmissions from the N neighbor nodes. The quotient is then subtracted at 709 from the total power of each bin as determined at 702. The calculation yields a remainder amount which is the RF power in each bin that is exclusively associated with unknown interference and noise.

The process continues at 710 where any narrowband interference can be removed from the sub-band associated with each active control channel frequency. This process can involve eliminating any bins containing narrowband interference so that they are no longer considered in subsequent processing operations. The elimination of the bins with narrowband interference is a simplistic model of the process performed in a communication receiver using any suitable filtering or signal excision circuit.

The process continues at 711 where the average power per bin is calculated based only on the spectral bins which remain (have not been eliminated) in a particular sub-band after the spectral bins containing narrowband interference have been removed. Calculating the average power per bin in this way facilitates a more accurate channel-to-channel comparison in subsequent steps. In this regard, consider a scenario where the narrowband interference excision process results in more bins being eliminated in one diversity control channel sub-band as compared to another diversity control channel sub-band. The sub-band with more eliminated bins in such a scenario would typically have an advantage (appear to have lower interference power). Comparing instead the power in only those spectral bins which remain after narrowband excision will avoid this problem.

In the example scenario shown in FIG. 8, narrowband interference is not present. In the absence of detecting such narrowband interference that can be removed or eliminated at 710, the node 101 simply calculates at 711 the average bin power based on the number of bins comprising each sub-band 812, 814, 816, 818 associated with a particular control channel P1, P2, S1, S2.

The value calculated at 711 is the average RF power per bin for a particular diversity control channel attributable to unknown interference and noise (exclusive of narrowband interference). At 712 the local node makes a comparison of this average bin power value among the diversity control channel sub-bands included in each control channel set. More particularly, the average bin power value determined for each diversity control channel in the set is compared to determine which control channel has the lowest average bin power value. For example, in the example shown in FIGS. 1 and 8, this would involve a comparison of the average bin power value for P1 to the average bin power value of P2, and a comparison of the average bin power for S1 as compared to the average bin power for S2. The diversity control channel within a particular control channel set that has the lowest average bin power value is understood to have the least amount of unknown interference and noise.

Thereafter, at 714 a selection is made within each control channel set of the particular control channel frequency that has the lowest average bin power. This selection is then used at 716 to assign a correlator to the control channel frequency in each control channel set that has the lowest average bin power. The process ends at 718 or continues on to perform other operations.

Applying the foregoing operations in the example scenario shown in FIG. 8, node 101 will select control channel frequency P1 from the primary control channel set consisting of P1 and P2. For this example, we assume for convenience that the sum of the control channel signal power on P1 (i.e., $$\sum_{i=1}^{N} P_{P1,i})$$

is approximately equal to the sum of the control channel signal power on P2 (i.e., $$\sum_{i=1}^{N} P_{P2,i}).$$

Consequently plot 802 of FIG. 8 can be understood to indicate that the power spectral density of noise plus interference indicated at 804 is consistently greater across the sub-band of P2 as compared to the power spectral density at 806 corresponding to sub-band of P1. Consequently, the average bin power of P1 will be less as compared to the average bin power of P2. The lesser average bin power value indicates that there is less noise and unknown interference in the P1 sub-band as compared to the P2 sub-band.

Similarly, node 101 will select control channel frequency S2 from the secondary control channel set consisting of S1 and S2. It can be observed in FIG. 8 that the total spectral power magnitude 808 in the frequency range associated with the sub-band of S1 is greater as compared to total spectral power magnitude 810 in the sub-band associated with S2. Given that the secondary control channel set consisting of S1 and S2 are inactive in this example, the lesser value associated with S2 indicates that there is less noise and unknown interference in the S2 sub-band as compared to the S1 sub-band.

There is a more basic version of the process in FIG. 7 that can be implemented in scenarios where the control channel power values from neighbor nodes are dependent upon each other such that they are received by the local node at the same power after free-space path loss (frequency dependent). In this case, the power in the bins associated with each diversity control channel sub-band can be summed to obtain the total power in each diversity control channel. The total power in each diversity control channel can then be compared and the channel with the lowest total power in each control channel set can then be selected for purposes of assigning a correlator.

A more complex embodiment can be implemented where control channel transmissions are received by the local node at the same power as described above, but narrowband interference is present and is being excised by the receiver circuit. In such a scenario, steps 703-709 could be omitted in FIG. 7 but the narrowband interference would be removed in a manner similar to that described in step 710. Following the elimination of the affected bins associated with such narrowband interference, the process could proceed in a manner similar to that previously described herein with respect to steps 711-718. In particular, the average bin power can be calculated for the remaining spectral bins in each diversity control channel sub-band after those bins associated with narrowband interference have been eliminated. The local node could then compare the average bin power determined for each diversity control channel within a particular control channel set and select the control channel with the lowest average bin power.

In other scenarios, transmitted power value for the control channels can be set such that the control channel signals are received at different power levels at the receiver of the local node. In such instances it is advantageous for the local node to subtract off the signal power associated with control channel transmission from its N neighbor nodes as described herein with regard to steps 703-709 of FIG. 7. In such embodiments, narrowband interference excision capability as described in step 710 may or may not be included. In the absence of such narrowband interference excision, the remaining bin power (power per bin) calculated at step 709 can be summed for each diversity control channel to obtain the total power associated with unknown interference and noise. The result for each diversity control channel can then be compared within a control channel set to select the diversity control channel having the lowest total power value (indicating the least amount of unknown interference and noise).

Figure 9:
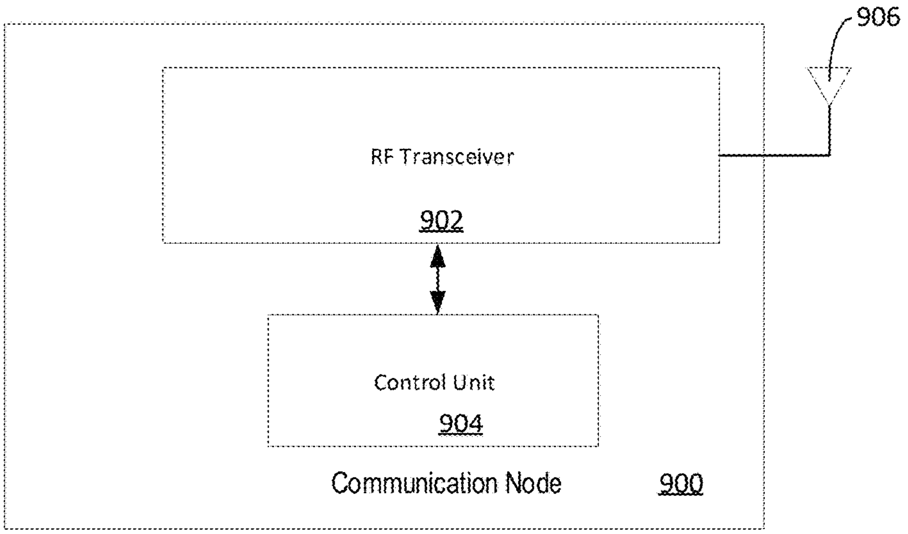
FIG. 9 is a block diagram of an exemplary network node in an ad-hoc communication network.

Shown in FIG. 9 is a simplified block diagram of a MANET communication node 900 which is useful for understanding certain aspects of a solution described herein. The communication node includes an RF transceiver 902 and a control unit 904. Data and voice communications are transmitted and received wirelessly at node 900 using RF transceiver 902. The transceiver 902 can be configured to communicate through antenna 906 using a CDMA waveform. Control over such data communications are facilitated by the control unit 904. In some scenarios, the control unit can be configured to cause the node 900 to implement one or more communications in accordance with the methods and techniques described herein.

The control unit 904 can comprise one or more components such as a processor, an application specific circuit, a programmable logic device, a digital signal processor, or other circuit programmed to perform the functions described herein. Embodiments can be realized in one computer system or several interconnected computer systems. Any kind of computer system or other apparatus adapted for carrying out the methods described herein is suited. The computer system can have a computer program that can control the computer system such that it carries out the methods described herein.

Communication node 900 should be understood to be one possible example of a communication node which can be used in connection with the various embodiments. However, the embodiments are not limited in this regard and any other suitable node architecture can also be used without limitation.

Figure 10:
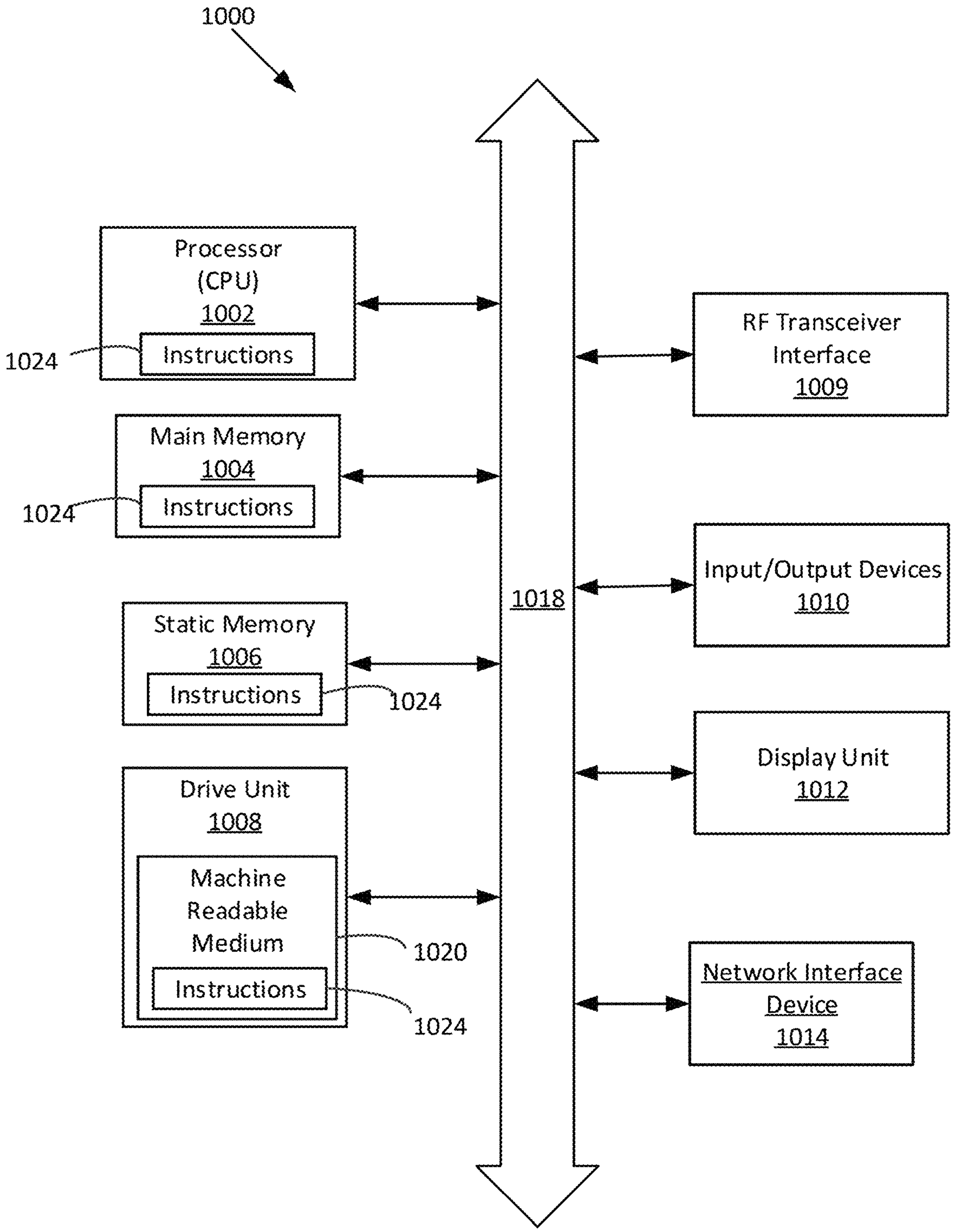
FIG. 10 is useful for understanding a control unit which facilitate various operations of a network node.

Referring now to FIG. 10, there is shown a hardware block diagram comprising an exemplary computer system 1000. The control unit can include a set of instructions which are used to cause the system to perform any one or more of the methodologies discussed herein. In one or more embodiments, the exemplary computer system 1000 can correspond to control unit 954 in FIG. 9. While only a single machine is illustrated it should be understood that embodiments can be taken to involve any collection of machines that individually or jointly execute one or more sets of instructions as described herein.

The computer system 1000 is comprised of a processor 1002 (e.g. a central processing unit or CPU), a main memory 1004, a static memory 1006, a drive unit 1008 for mass data storage and comprised of machine readable media 1020, RF transceiver interface 1009, input/output devices 1010, a display unit 1012 (e.g. a liquid crystal display (LCD) or a solid state display), and a network interface device 1014. Communications among these various components can be facilitated by means of a data bus 1018. One or more sets of instructions 1024 can be stored completely or partially in one or more of the main memory 1004, static memory 1006, and drive unit 1008. The instructions can also reside within the processor 1002 during execution thereof by the computer system. The input/output devices 1010 can include a keyboard, a mouse, a multi-touch surface (e.g. a touchscreen) and so on. The network interface device 1014 can be comprised of hardware components and software or firmware to facilitate network data communications in accordance with a network communication protocol.

The drive unit 1008 can comprise a machine readable medium 1020 on which is stored one or more sets of instructions 1024 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include magnetic media, solid-state memories, optical-media and so on. More particularly, tangible media as described herein can include; magnetic disks; magneto-optical disks; CD-ROM disks and DVD-ROM disks, semiconductor memory devices, electrically erasable programmable read-only memory (EEPROM)) and flash memory devices. A tangible medium as described herein is one that is non-transitory insofar as it does not involve a propagating signal.

Computer system 1000 should be understood to be one possible example of a computer system which can be used in connection with the various embodiments. However, the embodiments are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout the specification may, but do not necessarily, refer to the same embodiment.

Furthermore, the described features, advantages and characteristics disclosed herein may be combined in any suitable manner in one or more embodiments. One skilled in the relevant art will recognize, in light of the description herein, that the embodiments can be practiced without one or more of the specific features or advantages of a particular embodiment. In other instances, additional features and advantages may be recognized in certain embodiments that may not be present in all embodiments.

Reference throughout this specification to "one embodiment", "an embodiment", or similar language means that a particular feature, structure, or characteristic described in connection with the indicated embodiment is included in at least one embodiment. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the embodiments have been illustrated and described with respect to one or more implementations, equivalent alterations and modifications will occur to others skilled in the art upon the reading and understanding of this specification and the annexed drawings. In addition, while a particular feature of an embodiment may have been disclosed with respect to only one of several implementations, such feature may be combined with one or more other features of the other implementations as may be desired and advantageous for any given or particular application. Thus, the breadth and scope of the embodiments disclosed herein should not be limited by any of the above described embodiments. Rather, the scope of the invention should be defined in accordance with the following claims and their equivalents.

We claim:

1. A method for selecting a diversity control channel in a network communication system, comprising:

monitoring by a communication device received signals to identify nodes of interest (NOI) which transmit a control channel set comprising a plurality of diversity control channels, each diversity control channel defined by a sub-band having a predetermined frequency range;

estimating by the communication device a received control channel power associated with the NOI in a plurality of the diversity control channels which are actively in use by the NOI;

obtain a composite NOI signal power for each of the diversity control channels by summing the received control channel power for the NOI within each sub-band;

for each of the diversity control channels, using the composite NOI signal power and information comprising a total power present in each sub-band to determine an interference power that is exclusively associated with unknown interference and noise in the sub-band; and selecting a preferred diversity control channel from the plurality of diversity control channels which has the interference power of least magnitude.

2. The method of claim 1, further comprising selectively assigning a correlator to monitor the preferred diversity control channel of the control channel set.

3. The method of claim 1, wherein the information comprising the total power within each sub-band is based on measured total power in each of a plurality of spectral bins associated with each sub-band.

4. The method of claim 3, further comprising determining for each sub-band an average power per spectral bin associated with unknown interference and noise.

5. The method of claim 4, wherein the average power per spectral bin associated with unknown interference and noise is determined by (a) dividing the composite NOI signal power by the number of spectral bins associated with the sub-band to obtain a quotient representing an average received control channel power per bin, and (b) subtracting the quotient from the measured total power in each of the plurality of spectral bins associated with the sub-band.

6. The method of claim 5, further comprising modeling a removal of narrowband interference in at least one of the sub-bands by eliminating from consideration one or more of the spectral bins that are affected by the narrowband interference.

7. The method of claim 6, further comprising calculating the average power per spectral bin associated with unknown interference and noise after elimination of those spectral bins that are affected by the narrowband interference.

8. The method of claim 4, further comprising comparing the average power per spectral bin associated with unknown interference and noise which has been calculated for each sub-band to determine the preferred diversity control channel.

9. The method of claim 8, wherein the preferred diversity control channel is selected to have a lowest average power per spectral bin associated with unknown interference and noise.

10. The method of claim 1, wherein the estimating by the communication device of the received control channel power for one or more of the diversity control channels which are actively in use comprises frequency translating an estimate of a received power from a first diversity control channel or first data channel to a second diversity control channel.

11. The method of claim 10, further comprising using RF path loss versus frequency information to use the estimate of the received power from the first diversity control channel or first data channel to estimate the received power of the second diversity control channel.

12. The method of claim 10, further comprising using transmit power information communicated from one of the NOI to the communication device to estimate the received power of the second diversity control channel.

13. A communication device, comprising:

a receiver;

a transmitter; and a processor programmed with a set of instructions for selecting a diversity control channel in a network communication system, by monitoring received signals to identify a plurality of neighbor nodes of interest (NOI) which utilize two or more control channel sets, each comprising a plurality of diversity control channels, each diversity control channel respectively defined by a sub-band having a predetermined frequency range, estimating the received control channel power respectively associated with each NOI in a plurality of the diversity control channels which are actively in use by the NOI, obtaining a composite NOI signal power for each of the diversity control channels by summing the received control channel power for the plurality of NOI within each sub-band, for each of the diversity control channels, using the composite NOI signal power and information comprising a total power present in each sub-band to determine an interference power that is exclusively associated with unknown interference and noise in the sub-band, and within each control channel set, selecting a preferred diversity control channel from the plurality of diversity control channels which has the interference power of least magnitude.

* * * * *